United States Patent
Nakano

(10) Patent No.: US 6,683,585 B1
(45) Date of Patent: Jan. 27, 2004

(54) PICTURE DISPLAY CONTROL SYSTEM, IMAGE SIGNAL GENERATING DEVICE, AND PICTURE DISPLAY DEVICE

(75) Inventor: Takao Nakano, Tokyo (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 0 days.

(21) Appl. No.: 09/492,804

(22) Filed: Jan. 28, 2000

(30) Foreign Application Priority Data

Jul. 21, 1999 (JP) .......................... P11-205974

(51) Int. Cl.$^7$ ................................ G09G 5/00
(52) U.S. Cl. ........................ 345/10; 345/204
(58) Field of Search .................. 345/10, 152, 127, 345/3; 353/69; 348/745, 806, 441, 558, 65, 70

(56) References Cited

U.S. PATENT DOCUMENTS

| | | | | |
|---|---|---|---|---|
| 6,067,071 A | * | 5/2000 | Kotha et al. | 345/698 |
| 6,181,368 B1 | * | 1/2001 | Takahashi et al. | 348/65 |
| 6,313,813 B1 | * | 11/2001 | Narui et al. | 345/3.2 |
| 6,313,821 B1 | * | 11/2001 | Mizuno | 345/101 |
| 6,450,647 B1 | * | 9/2002 | Takeuchi | 353/69 |
| 2002/0149577 A1 | * | 10/2002 | Arai et al. | 345/204 |

FOREIGN PATENT DOCUMENTS

| JP | A7168541 | 7/1995 |
|---|---|---|
| JP | A10340069 | 12/1998 |

OTHER PUBLICATIONS

USB Monitor Control Class Specification, Jan. 5, 1998, Revision 1.0, pps. i–vi and 1–16.

* cited by examiner

Primary Examiner—Bipin Shalwala
Assistant Examiner—Nitin Patel
(74) Attorney, Agent, or Firm—Birch, Stewart, Kolasch & Birch, LLP

(57) ABSTRACT

An object is to control a picture display device from an image signal generating device (e.g. a PC) by using only a cable for transferring an image signal without using a USB cable or the like, so as to adjust the chromaticity, brightness, contrast, etc., in the picture display device and also to set r table data and OSD data and to switch the screen size etc. In a picture display control system, screen adjusting control information for adjusting the screen is added to an image signal outputted from an image signal generating device (1) and sent to a picture display device through an image signal cable, and the picture display device detects the screen adjusting control information from the image signal and adjusts the screen on the basis of the detected screen adjusting control information.

9 Claims, 12 Drawing Sheets

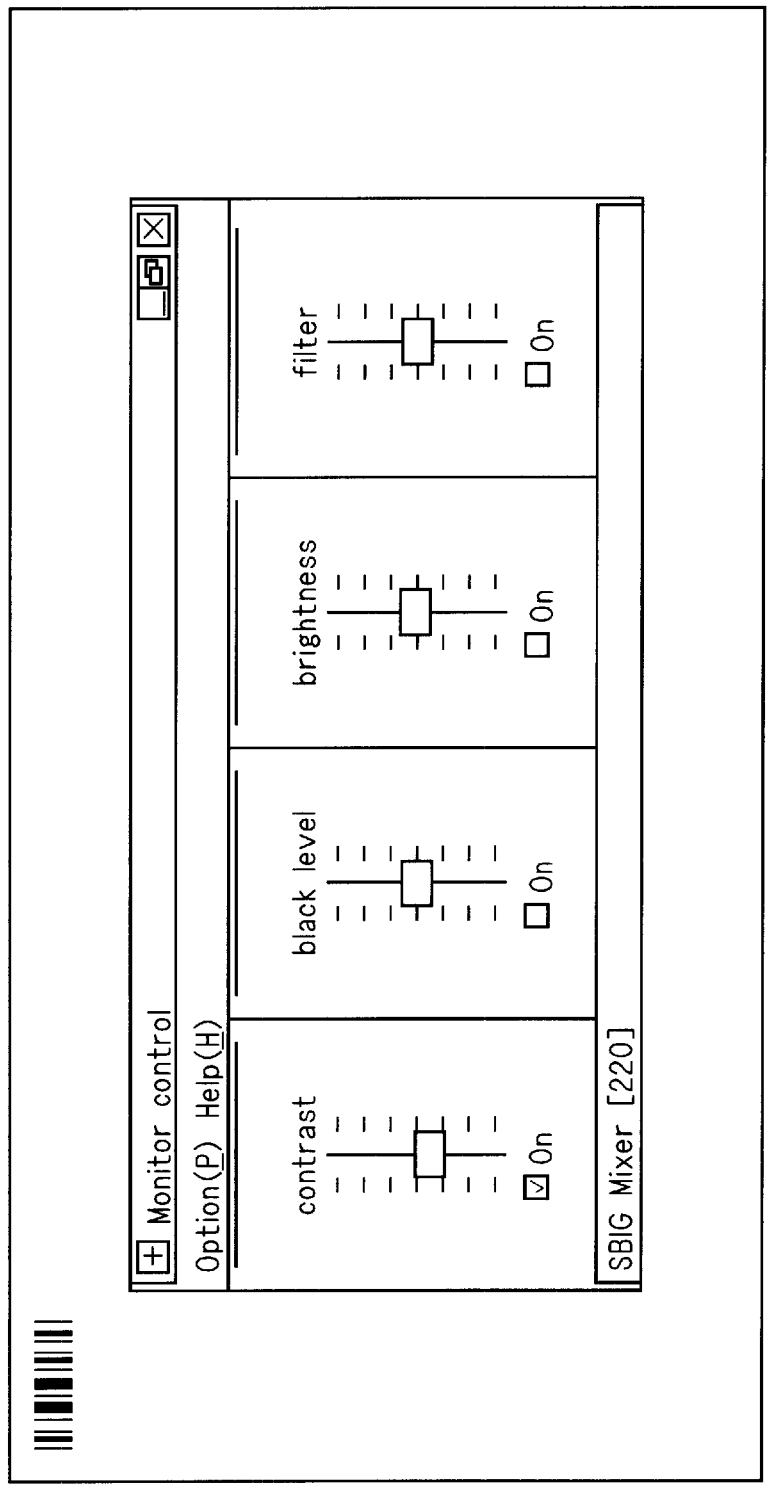
FIG. 3  EXAMPLE OF SCREEN INCLUDING CODED DATA

PICTURE DISPLAY CONTROL SYSTEM, IMAGE SIGNAL GENERATING DEVICE, AND PICTURE DISPLAY DEVICE

BACKGROUND OF THE INVENTION

1. Field of the Invention

The present invention relates to a picture display device for displaying an image signal outputted from an image signal generating device, such as a personal computer, a workstation, etc. (hereinafter simply referred to as PC), and to a picture display device control system in which the position, distortion, brightness, picture quality, etc. of the screen can be directly adjusted from the image signal generating device.

2. Description of the Background Art

FIG. 13 is a diagram showing a system in which a PC and a CRT (Cathode Ray Tube) display device are connected through a USB (Universal Serial Bus) to adjust the brightness, contrast, screen position, size, etc. in the CRT display device. The system shown in FIG. 13 includes a PC 30 containing a USB controller, a CRT display device 35, an image signal generating means 31 provided on the PC 30 and for generating screens for adjustments etc, the USB controller 32 for outputting screen adjusting information etc., an image signal cable 9 at least carrying an image signal 9a and a sync. signal 9b in the same cable, and a USB cable 34 provided separately from the image signal cable and having a connector of a different shape, for transferring the screen adjusting information from the USB controller 32 to the CRT display device.

The system further includes an image signal amplifying portion 10 receiving and amplifying the image signal outputted from the PC 30, an OSD adding circuit 23 for adding a signal for OSD (On-Screen Display) to the image signal, a drive circuit 24 for driving the CRT with the image signal outputted from the OSD adding circuit 23, a display portion 13 composed of a CRT for displaying the image signal coming from the drive circuit 24, a USB function 33 receiving the screen adjusting signal from the USB controller 32, for extracting the adjusting information and sending the information to an MPU 17 described later, the MPU (microcomputer) 17 for interpreting the adjusting information from the USB function 33 and controlling various adjustment and correction circuits in accordance with the contents, as well as setting operation modes in various parts of the CRT display device, and a screen adjusting portion 19 for making adjustments in various parts on the basis of the adjusting information from the MPU 17.

Next its operation will be described. Dedicated software is operated on the PC 30 to generate a screen for adjustments like that shown in FIG. 14 in the image signal generating means 31, which is displayed on the CRT display device 35. The user selects items to be adjusted on the adjustment screen and operates to make adjustments while looking at the screen. The operated items and adjusting data are outputted to the USB cable 34 via the USB controller 32.

The CRT display device 35 receives this signal at the USB function 33 and the signal is sent to the MPU 17. The MPU 17 interprets the contents of the received signal. When it indicates adjustment of the brightness of the displayed screen, for example, it adjusts the image signal amplifying portion 10 to vary the magnitude of the signal voltage supplied to the drive portion 24 from the image signal amplifying portion 10. When it indicates adjustment of the position, for example, the MPU 17 adjusts the screen adjusting portion 19 to adjust the phase relation between the image signal outputted from the drive circuit 24 and the sync. signal, so as to adjust the position of the image.

When the USB cable 34 is connected to the PC 30, the communication can be established when the following conditions are satisfied: whether the PC 30 contains the USB function; whether signals can be properly sent/received between the PC 30 and the CRT display device 35 when the USB controller 32 in the PC 30 and the USB function 33 in the CRT display device 35 are connected to each other, for example. Furthermore, depending on the model of the PC 30, some operations may be required before making the communication; software for enabling the functions of the USB to work has to be installed, for example.

While a DDC (Direct Digital Control) communication line provided in the image signal cable 9 together with the image signal may be utilized, it requires special DDC driver software since the DDC signal is outputted via a graphic chip in the PC 30 (not shown).

The conventional device requires that the USB controller and driver software should be provided on the PC and that a cable for USB should be connected besides the image signal cable. It further requires special environment, such as the USB function on the picture display device.

When the DDC communication is used, special DDC driver software is required since the signal is outputted via a graphic chip in the PC, and this method is not practical because it is necessary to prepare many pieces of driver software produced by different manufactures since graphic chips produced by different manufacturers require different pieces of driver software.

Furthermore, data for γ (gamma) correction on the picture display device and font data for OSD are generated by data generating software on the PC, and the data must be once stored in a medium like a floppy disk and the data is set in the picture display device from a dedicated writing device by using the data stored in the medium.

SUMMARY OF THE INVENTION

According to a first aspect of the present invention, a picture display control system comprises: an image signal generating device for adding screen adjusting control information for screen adjustment to an image signal and outputting the image signal; and a picture display device having picture display means receiving as an input the image signal to which the screen adjusting control information is added and which is outputted from the image signal generating device; detecting means for detecting the screen adjusting control information from the image signal to which the screen adjusting control information is added; and screen adjusting means for making adjustment on the basis of the screen adjusting control information detected by the detecting means.

Preferably, according to a second aspect, in the picture display control system, the image signal generating device comprises screen adjusting control information adding means for adding the screen adjusting control information to the image signal by replacing part of the image signal with the screen adjusting control information, and the detecting means comprises a screen adjusting control information extracting portion for extracting the segment bearing the screen adjusting control information from the image signal to which the screen adjusting control information is added, and an adjusted item determining portion for identifying adjusted items and adjusting data from the extracted screen adjusting control information and setting data in corresponding adjusting means in accordance with the identified result.

Preferably, according to a third aspect, in the picture display control system, the screen adjusting control information adding means adds the screen adjusting control information to the image signal as tone information in part of pixels among pixels forming a displayed picture, and the detecting means extracts the screen adjusting control information by using at least one threshold from the image signal to which the screen adjusting control information is added.

Preferably, according to a fourth aspect, in the picture display control system, the screen adjusting control information adding means inserts signal in a bit in one arbitrary position in tone data when the tone information is represented as digital data.

Preferably, according to a fifth aspect, in the picture display control system, the screen adjusting control information is added in place of part of the image signal in a picture display period or an image non-display period.

Preferably, according to a sixth aspect, in the picture display control system, the screen adjusting control information adding means determines whether the screen adjusting control information has been normally received by detecting data error check information for validating received data which is added to the screen adjusting control information.

Preferably, according to a seventh aspect, in the picture display control system, the screen adjusting control information adding means specifies the screen adjusting control information added to the image signal by detecting a header added to the screen adjusting control information.

Preferably, according to an eighth aspect, in the picture display control system, the screen adjusting control information adding means specifies the screen adjusting control information added to the image signal by detecting timing information for detection added to the screen adjusting control information and generating a sampling clock.

Preferably, according to a ninth aspect, in the picture display control system, the screen adjusting control information adding means specifies the screen adjusting control information added to the image signal by detecting a clock for detection added to the screen adjusting control information and generating a sampling clock.

Preferably, according to a tenth aspect, in the picture display control system, the screen adjusting control information adding means adds the screen adjusting control information in bar code form, and the detecting means detects the bar code information as the screen adjusting control information.

Preferably, according to an eleventh aspect, in the picture display control system, the picture display means is a display device which displays a picture by raster scanning, and the screen adjusting control information adding means repeatedly adds the screen adjusting control information only in a predetermined number of lines among a plurality of lines on the screen of the picture display means.

According to a twelfth aspect, an image signal generating device for adding screen adjusting control information for screen adjustment to an image signal and outputting the image signal comprises screen adjusting control information adding means for adding the screen adjusting control information to the image signal by replacing part of the image signal with the screen adjusting control information.

According to a thirteenth aspect, a picture display device comprises: picture display means receiving as an input an image signal to which screen adjusting control information for adjusting and controlling a screen is added; detecting means for detecting the screen adjusting control information from the image signal to which the screen adjusting control information is added; and screen adjusting means for making adjustment on the basis of the screen adjusting control information detected by the detecting means.

The above-described present invention has the following effects.

The picture display control system of the first aspect provides a system which can adjust the screen and set and change data directly from an image signal generating device by using only a conventional image signal cable without the need of other additional control cable.

The picture display control system of the second aspect provides a system which can adjust the screen and set and change the data in a more complex way for items of a larger number of kinds directly from an image signal generating device and which can also display the screen adjusting control information in part of the screen, by using only a conventional image signal cable without the need of other additional control cable.

According to the picture display control system of the third aspect, the screen adjusting control information can be included in the image signal and then the screen adjusting control information can be extracted from the image signal.

According to the picture display control system of the fourth aspect, the original image can remain and the visibility of the screen adjusting control information on the display screen can be freely controlled.

According to the picture display control system of the fifth aspect, particularly, the screen adjusting control information is not displayed when part of an image nondisplay period is replaced by the screen adjusting control information.

According to the picture display control system of the sixth aspect, normal screen adjusting control information can be extracted exclusively and it can be distinguished from the image data.

According to the picture display control system of the seventh aspect, the screen adjusting control information can be detected even when it is added in arbitrary position on the screen.

According to the picture display control system of the eighth aspect, even if the picture display means does not contain its own sampling clock generating means inside, the device can know the sampling timing from the timing information to extract the screen adjusting control information from the image signal.

According to the picture display control system of the ninth aspect, even if the picture display means does not contain its own sampling clock generating means inside, the device can know the sampling timing from the clock for detection to extract the screen adjusting control information from the image signal.

The picture display control system according to the tenth aspect can be applied regardless of whether or not the picture display means contains its own sampling clock generating means inside, and the bar code information can be used also as patterns for adjusting the screen.

The picture display control system according to the eleventh aspect can display linear patterns, and the patterns can be used as patterns for adjusting the screen to certainly provide an image required for adjustments, which simplifies the adjusting method and provides an accurate adjusting screen.

The twelfth aspect provides an image signal generating device which can directly adjust the screen and change the data in the picture display device by using only a conventional image signal cable without the need of other additional control cable.

The thirteenth aspect provides a picture display device in which the screen can be adjusted and data can be changed directly, by using only a conventional image signal cable without the need of other additional control cable.

The present invention has been made to solve the problems described above, and an object of the invention is to provide an image signal generating device, a picture display device, and a picture display control system which are capable of outputting screen adjusting control information in a form added to an image signal and which are also capable of setting γ table data and OSD data and switching the screen size etc., as well as adjusting the chromaticity, brightness, contrast, etc., by using application software without the need of special hardware or driver software, and without the need of cables such as a USB cable other than an image signal cable.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an example of a screen in which a bar code is provided in an adjusting screen of the invention.

DESCRIPTION OF THE PREFERRED EMBODIMENTS

Figure 1:
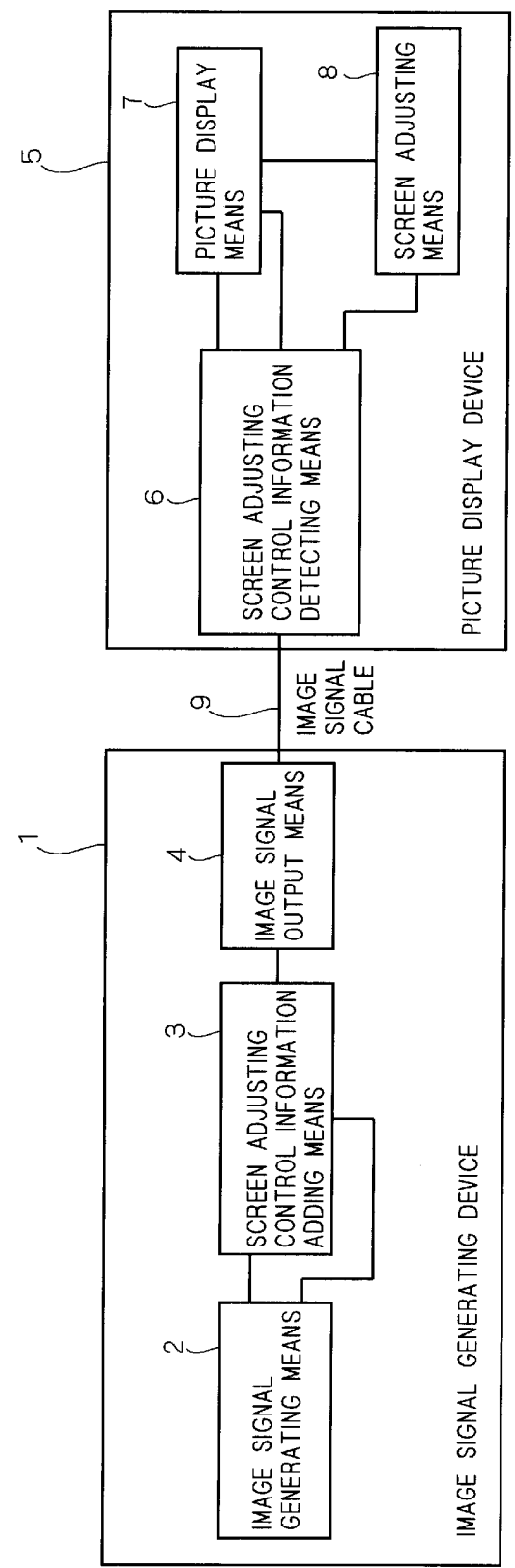
FIG. 1 is a block diagram showing a general structure of a picture display control system according to a first preferred embodiment.

The picture display device control system of the present invention will now be specifically described referring to the drawings showing its preferred embodiments. In the drawings, the same reference characters as those in the conventional system shows the same or corresponding components.

First Preferred Embodiment

FIG. 1 is a diagram showing the concept of the structure of a picture display device control system according to the invention. As shown in FIG. 1, this system includes a picture display device 5, an image signal generating device 1 for adding screen adjusting control information for the picture display device 5 to the image signal and outputting the signal, an image signal generating means 2 for generating an image for making adjustments and sending adjusted items and adjusting data selected on the adjusting screen to a screen adjusting control information adding means 3 described later, the screen adjusting control information adding means 3 for adding the adjusting control information received from the image signal generating means 2 to the image signal, an image signal output means 4 for outputting the image signal with the added adjusting information, and an image signal cable 9 for transferring the image signal outputted from the image signal generating device 1 to the picture display device 5.

The picture display device 5 includes a screen adjusting control information detecting means 6 receiving the image signal with the screen adjusting control information added to it from the image signal generating device 1, for extracting the screen adjusting control information from the image signal and detecting the screen adjusted items and adjusting data, a picture display means 7 receiving the image signal and for converting the signal into an image, and a screen adjusting means 8 for adjusting the screen on the basis of the screen adjusted items and adjusting data detected by the screen adjusting control information detecting means 6.

The operation will be described next. First, the image signal generating device 1 is activated and the screen adjusting mode is entered. Then a menu screen for screen adjustments is displayed and software is operated to add the screen adjusting control information to the image signal by replacing part of the image signal with the screen adjusting control information. With this software, the adjusted items and adjusting data selected by adjusting adjustment bars on the menu screen with a mouse etc. are sent from the image signal generating means 2 to the screen adjusting control information adding means 3, and the screen adjusting control information is substituted for part of the image signal and sent to the picture display device.

In the method for adding the adjusted items and adjusting data to the image signal, the adjusted items are represented in 8- or 16-bit codes and the adjusting data is represented in hexadecimal or codes, for example. If the picture display device 5 is of a type capable of internally generating a sampling clock by itself, the adjusted items and adjusting data are added to the image signal as follows: in the case of an analog image signal, each bit of the adjusted items and adjusting data is substituted for the image signal as data representing tone of one pixel, and in the case of a digital image signal, each bit of the adjusted items and adjusting data is substituted for the image signal as data of a bit in at least one arbitrary position of one pixel.

When the picture display device is of a type incapable of internally generating a sampling clock by itself, clock data for detection or timing information for detection must be added to the adjusted items and adjusting data. In this case, it may be one-bit information for a plurality of pixels.

Preferably, parity information is also added to the data to enhance the validity of the data. More specifically, the screen adjusting control information is added as bar code data. This method can be applied regardless of whether or not the picture display device can internally generate the sampling clock by itself. The screen adjusting control information may be added in either the picture display period or non-display period.

The picture display device 5 receives the image signal to which the screen adjusting control information is added and the sync. signal, and then the picture display means 7 calls adjusted data that is stored in an internal memory (not shown) on the basis of the information of frequency and polarity of the sync. signal and displays an image with a screen width, position, etc. conforming with the image signal. If the screen adjusting control information is added in the picture display period, the screen adjusting control information is displayed at the same time. If it is not desired to display the screen adjusting control information, some means may be provided to, prior to displaying the image, replace the screen adjusting control information segment with image data in the line preceding to or following the line in which the screen adjusting control information is added, or to fix it with given data.

When the picture display device is of a type capable of internally generating a sampling clock by itself, the screen adjusting control information detecting means 6 extracts the screen adjusting control information from the image signal by using a sampling clock with controlled frequency and phase generated on the basis of the sync. signal and picture quality information, and it identifies the adjusted items and sets the adjusting data, and sends it to the screen adjusting means 8.

When the picture display device is of a type incapable of internally generating a sampling clock by itself, the screen adjusting control information detecting means 6 establishes a sampling clock on the basis of the clock data or detecting timing information added to the image signal, and it extracts the screen adjusting control information from the image signal on the basis of the timing, identifies the adjusted items and sets the adjusting data, and sends it to the screen adjusting means 8.

The screen adjusting means 8 adjusts the target screen on the basis of the adjusted items and adjusting data detected by the screen adjusting control information detecting means 6. The picture display device may be a liquid crystal display, plasma display, CRT display, EL display, or LED display, for example.

Second Preferred Embodiment

Next, the structure of a picture display device control system 100 according to a second preferred embodiment of the invention will be described referring to FIGS. 2A and 2B, in which the picture display device is a liquid crystal display device and the screen adjusting control information is added to the image signal in bar-code form.

Figure 2A:
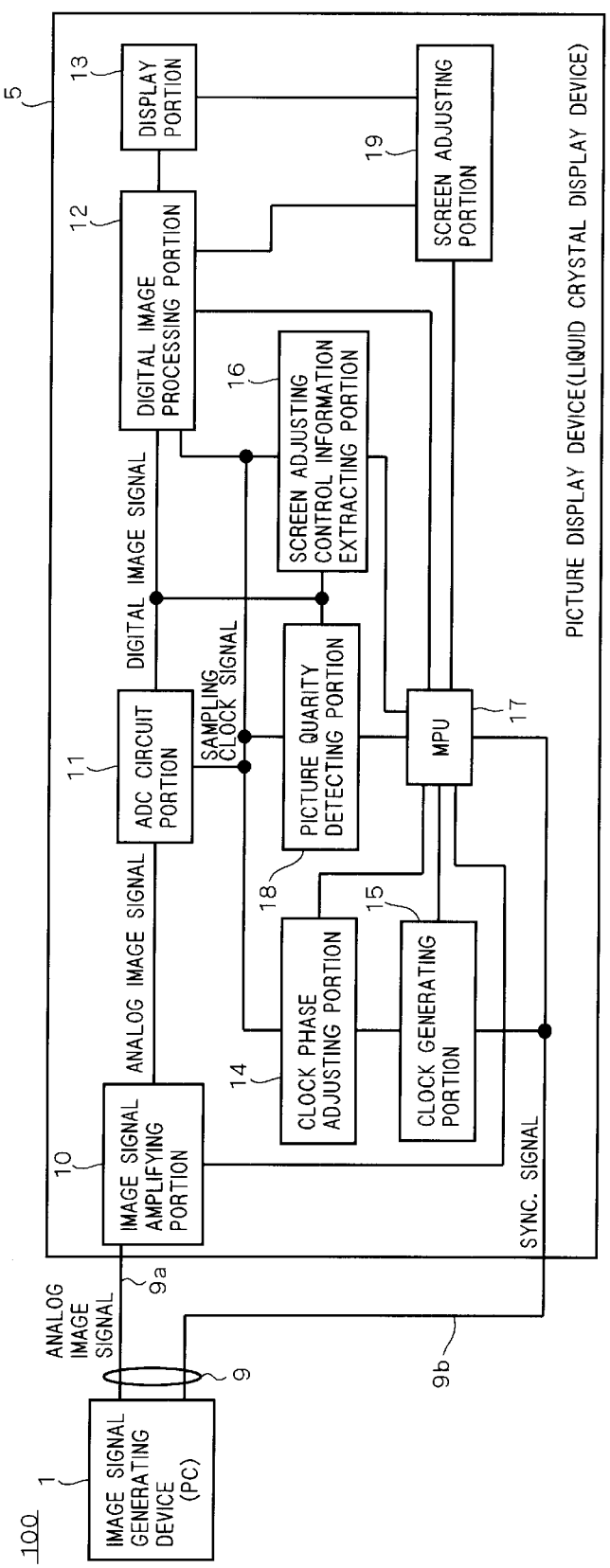
FIGS. 2A and 2B are block diagrams showing the structure of a liquid crystal display device of a second preferred embodiment.

As shown in FIG. 2A, the picture display device control system 100 includes a PC 1 for adding the screen adjusting control information for the liquid crystal display device 5 as coded data in bar-code form to an analog image signal and outputting the signal, an image signal cable 9 for connecting the PC 1 and the liquid crystal display device 5, an image signal amplifying portion 10 for adjusting the gain and bias of the analog image signal inputted through the image signal cable 9, and an ADC circuit portion (an analog-to-digital converter) 11 for converting the analog image signal outputted from the image signal amplifying portion 10 to a digital image signal by using an internally generated sampling clock signal.

The system further includes a digital image processing portion 12 for applying enlargement, γ correction, etc. to the image data converted to digital in the ADC circuit portion 11, a display portion 13 formed of a liquid crystal display panel, for example, for displaying the digital image processed in the digital image processing portion 12, and a screen adjusting control information extracting portion 16 for detecting the screen adjusting control information added to the digital image signal converted in the ADC circuit portion 11 and transferring the information to an MPU 17 described later.

The system further includes a picture quality detecting portion 18 for detecting the picture quality of the digital image signal converted in the ADC circuit portion 11 and transferring it to the MPU 17, a clock generating portion 15 for generating a clock having the most appropriate frequency and phase determined in the MPU 17 and outputting the clock in synchronization with the input sync. signal, and a clock phase adjusting portion 14 for adjusting the phase of the clock generated in the clock generating portion 15 to optimize the picture quality detected in the picture quality detecting portion 18 according to instructions from the MPU 17 and supplying it to the ADC circuit portion 11.

The system further includes a screen adjusting portion 19 for adjusting the screen on the basis of the adjusted items and adjusting data sent from the MPU 17, and the MPU (microcomputer) 17 for initializing the processing portions, determining the picture quality, adjusting and controlling the clock frequency and phase, identifying and setting the adjusted control items and adjusting data, etc., wherein the MPU 17 has a memory (not shown) as a storage for storing various signal data. FIG. 2B is a diagram showing the internal structure of the digital image processing portion 12 shown in FIG. 2A.

Next, its operation will be described in detail. The PC 1 is started and then the screen adjusting mode is entered. Then the display portion 13 in the liquid crystal display device 5 displays a menu screen for screen adjustments (see FIG. 3), and the screen adjusting control information is converted into data in bar-code form and software which can add the information to the image signal by substituting it for part of the image signal is operated. The screen adjusting control information in bar-code form is added in such a way that it is displayed in a predetermined position where it can be displayed unnoticeably, e.g. in the upper corner in the screen as shown in FIG. 3 While the bar code is shown in a widened form in FIG. 3 for a clear understanding, it is actually displayed in one line in the horizontal direction.

The user operates a mouse etc. to adjust the brightness or other item while looking at the screen adjusting menu screen (FIG. 3) displayed in the display portion 13 in the liquid crystal display device 5. In this operation, the bar code also changes in accordance with the operation on the menu. While the image signal provided with bar codes are supplied to the liquid crystal display device 5 via the image signal cable 9, the bar codes are not affected by the sorts and functions of the graphic chip as hardware nor by graphic driver as software on the PC 1.

In the liquid crystal display device 5, the received analog image signal is amplified in the image signal amplifying portion 10 and converted into a digital image signal via the ADC converting portion 11. The MPU 17 adjusts the clock frequency in the clock generating portion 15 and adjusts the clock phase in the clock phase adjusting portion 14 on the basis of the data detected in the picture quality detecting portion 18 and the frequency and polarity of the sync. signal, so as to optimize the image position and picture quality in the display screen in the display portion 13.

Figure 4:
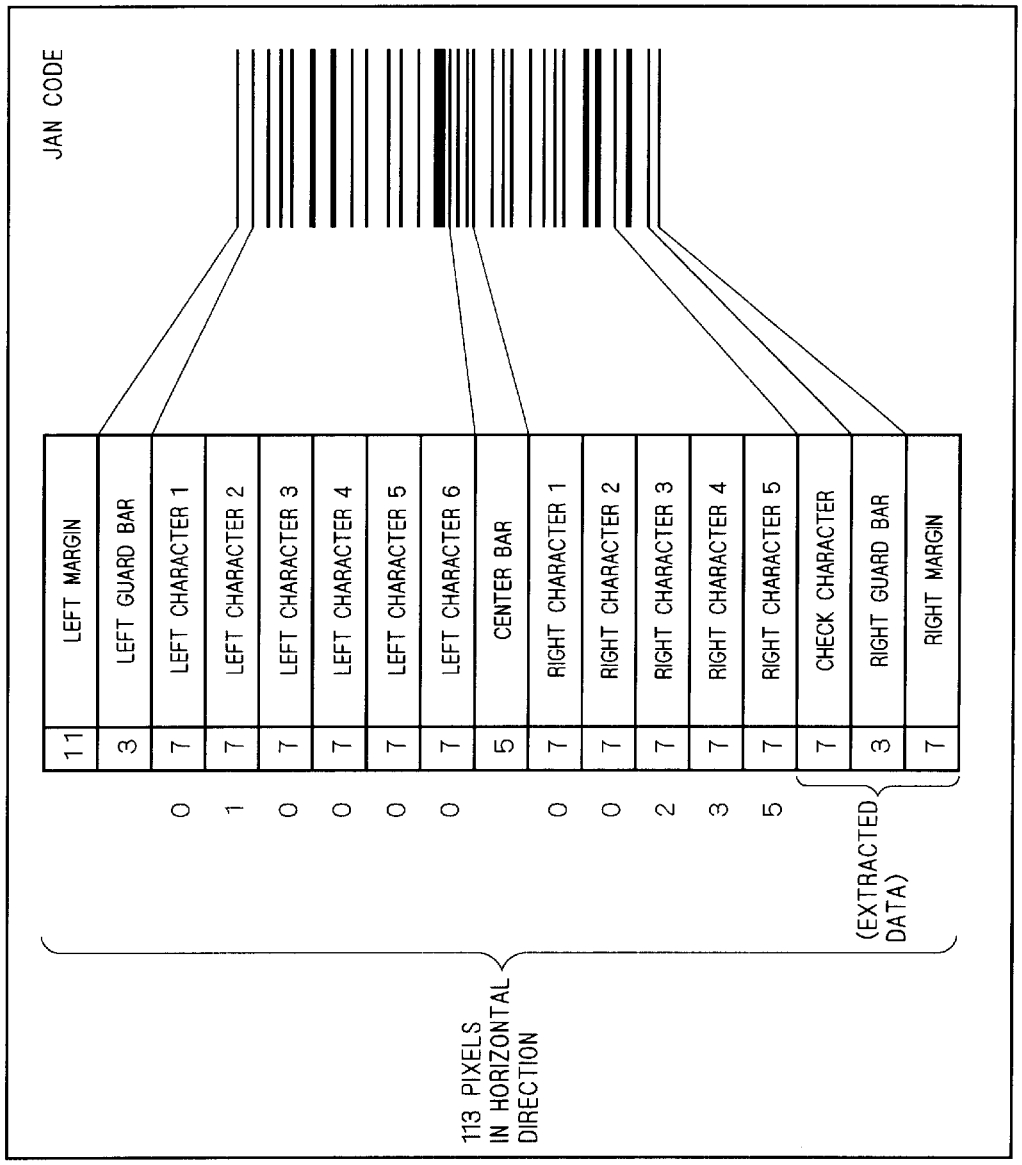
FIG. 4 shows an example of construction of a JAN code as a typical bar code.

After the adjustments, the screen adjusting control information extracting portion 16 separates and extracts the bar code in the form of JAN (Japanese Article Number) code shown in FIG. 4, for example, from the image signal. The MPU 17 may substitute for the screen adjusting control information extracting portion 16. The MPU 17 reads the extracted data from the screen adjusting control information extracting portion 16 and identifies the contents indicated by the bar code.

According to the standard of the bar codes, as shown in FIG. 4, it contains 11 seven-bit characters in total on both sides of the center bar, which can represent numbers from zero to nine. At present, the left characters 1 to 6 are used for product supplier code and the right characters 1 to 5 are used for product item code. In the second preferred embodiment, the left characters 1 and 2 are used for operation mode and the left characters 3 to 6 and the right characters 1 to 5 are used for data, for example. Since it also contains a check character, errors caused by noise etc. during the data communication can be detected to prevent malfunction.

That is to say, the check character is generated on the basis of a given computation. When the receiving device reads the code, it compares the solution obtained by the computation and the number of the check character read, to see whether the communication has been properly done.

For example, if the operation mode 01 is set to indicate a change in brightness, the data shown in FIG. 4 indicates changing the brightness to the 000000235 level. The MPU 17 outputs a voltage control signal to the screen adjusting portion 19 on the basis of the indication to adjust the brightness in the screen display portion 13 to a level corresponding to 000000235. Although the data is handled as absolute value herein, it may be handled as relative value.

Since the bar code is represented by pixels in the horizontal direction as stated above, one line among a plurality of lines arranged in the vertical direction (raster) can be used. When the R, G, B image signals are separately used, 3×99 kinds of operation modes and 3×9 characters of data can be sent at once. The amount of data can be increased also by increasing the number of bar codes in one line.

As stated above, the present invention provides a screen control and data setting method which does not require any signal connection cable other than the image signal cable, unlike the system using USB, and which is not affected by the type of the PC (for example, workstation, Macintosh computer (MAC), DOS/V adapted computer, etc.) nor by the video chip and driver software for sending out the image signal from the PC.

Figure 5:
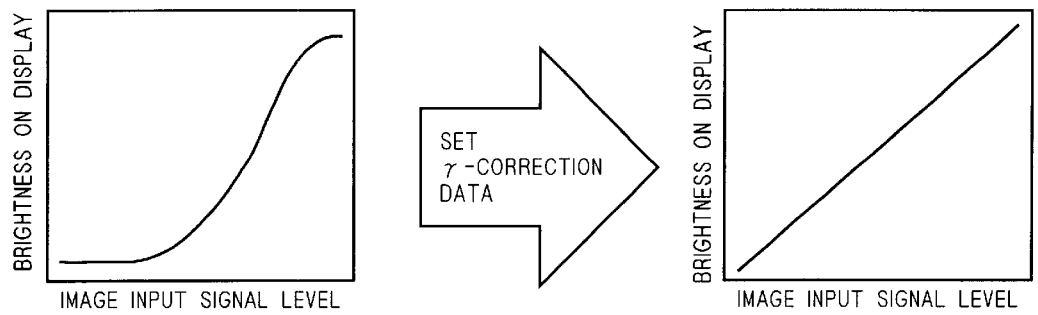
FIG. 5 is a diagram showing a variation of the relation between the image input signal level and the displayed brightness achieved by setting γ table.

The description above has shown embodiments in which the screen is controlled by means of the screen adjusting data. For γ correction, a data generating program for γ correction is operated on the PC 1 and the generated data is coded and added to the image signal, and then the data can be set directly in the γ correction table 22 on the liquid crystal display device 5 shown in FIG. 2B. FIG. 5 shows a variation of the characteristic curve showing the relation between the voltage level of the video input signal in the liquid crystal display device 5 and the brightness in the display portion 13 achieved through the γ correction.

The γ correction data is heavy in amount since the correction data are required independently for R, G, and B. In this case, the data transfer time can be shortened by increasing the amount of information for one screen by using a plurality of lines and adding separate data for them. The data transfer time can be shortened also by multiplexing the data by using the bar codes independently for R, G and B as stated above. A larger amount of data can be sent also by providing a plurality of thresholds. For example, when the reference voltage for making determination includes one voltage, the determination can be made only between two values: "1" or "0." However, when a plurality of determination-making reference voltages are set as 1.5 V, 2.5 V, 3.5 V, for example, the determination can be made with four values of "0," "1," "2," and "3," and thus the amount of information can be increased. These methods allow the γ correction data to be instantaneously varied online.

Figure 2B:
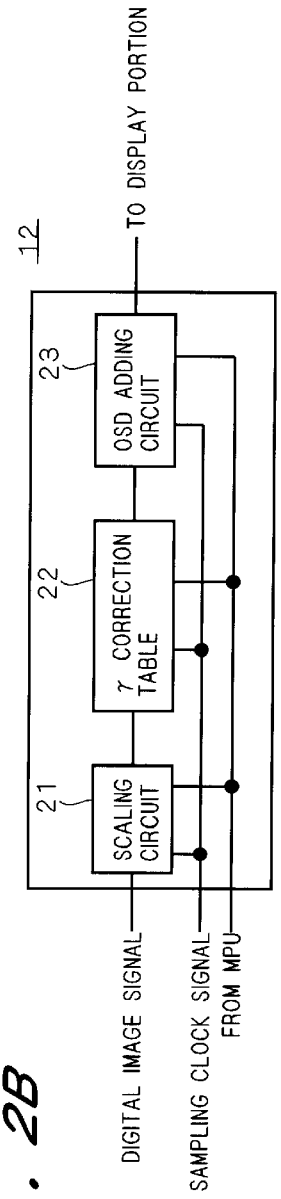
Figure 6:
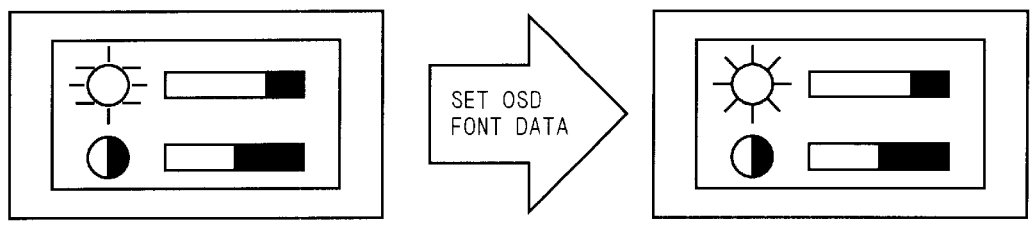
FIG. 6 is a diagram showing a variation of display achieved through setting of OSD font data.

An OSD font data generating program may be operated on the PC 1, in which case the generated data is coded and added to the image signal, and then the OSD font data can be set directly in a memory (not shown) in the OSD adding circuit 23 on the liquid crystal display device 5 shown in FIG. 2B. FIG. 6 shows a variation of the OSD display made when the OSD font data is set. That is to say, the sign indicating the font type in FIG. 6 (the sign in the upper part of the diagram) is varied after the data is set.

According to the present invention, unlike the conventional system, the OSD font data can be instantaneously changed online, which allows the user to freely change the OSD font pattern while looking at the screen.

Figure 7:
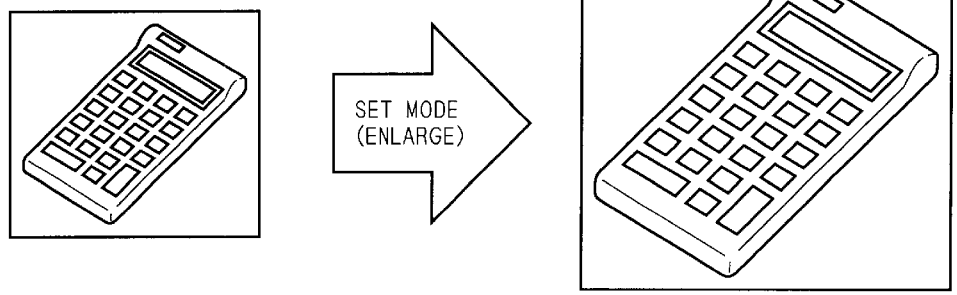
FIG. 7 is a diagram showing an example of switch of a screen enlarging mode.

An operation mode switching program may be operated on the PC 1, in which case the generated data is coded and added to the image signal so as to switch the scaling circuit 21 on the liquid crystal display device 5 shown in FIG. 2B, for example. FIG. 7 shows a variation of the display screen achieved through the switching. The user can instantaneously switch it from the PC 1 by using a mouse or the like while looking at the display screen without the need of OSD operation on the liquid crystal display device.

While the screen adjusting control information can be successively added to the image signal, it may be added in once per several to several tens of frames on the screen to reduce the influence on the image screen. In this case the user can use the system without taking notice of the coded data. It may be added to only one of R, G, and B so that it is not displayed noticeably on the screen.

While the description above has shown examples in which the screen adjusting control information is added in successive pixels in the horizontal direction, the screen adjusting control information may be added in pixels successive in the vertical direction.

Third Preferred Embodiment

Next, the structure of a picture display device control system 200 according to a third preferred embodiment of the invention will be described referring to FIG. 8.

Figure 8:
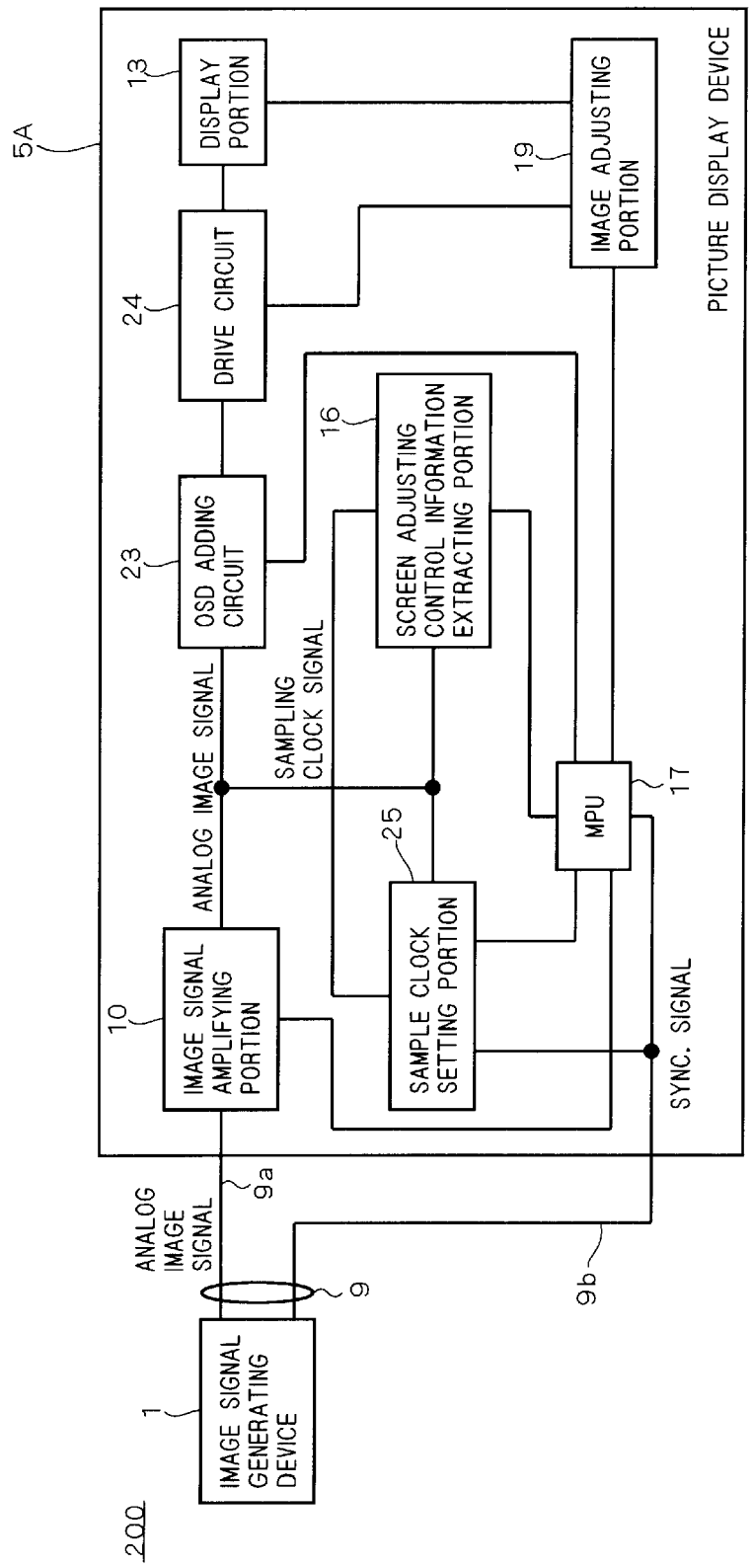
FIG. 8 is a block diagram showing the structure of a CRT display device according to a third preferred embodiment.

FIG. 8 is a diagram mainly showing the structure of a picture display device 5A, particularly a CRT display device, in the picture display device control system 200. As shown in FIG. 8, the picture display device 5A has a sample clock setting portion 25 and the drive circuit 24 and the display portion 13 formed of a CRT that were described in the conventional technique. The same components as those in the picture display device 5 explained referring to FIG. 2A are shown by the same reference characters and not described here again.

Next, its operation will be described. The picture display device 5 explained referring to FIG. 2A has the clock generating portion 15 and the phase adjusting portion 14 for generating a sampling clock having the most appropriate phase and frequency to extract the screen adjusting control information from the image signal synchronized with the sync. signal. However, the CRT display device 5A does not include these components. Accordingly, clock data for detection or timing information for detection is added to the image signal, as well as the screen adjusting control information shown in the second preferred embodiment.

For example, methods for adding the detecting clock data or timing information include:

1) to add bright/dark timing that indicates data intervals to the header and measure the time and capture the data at this time intervals.
2) to measure the bright-to-bright time of the signal and capture the values at the half-time (midway) points on the basis of the beginning of bright.
3) to superimpose the amplitude of the data portion on the amplitude of the clock portion as the base, separate the clock and data with two thresholds, and read the data with the timing of the clock.
4) to add a clock to an arbitrary one of the R, G and B signals and add the data to at least one signal other than that.

Accordingly the sample clock setting portion 25 for specifying the sampling timing and generating a sampling clock in accordance with any of the methods above is provided in place of the phase adjusting portion 14, the clock generating portion 15, and the picture quality detecting portion 18 in the CRT display device 5 shown in FIG. 2A.

For the structure of the sample clock setting portion 25, in the case of the methods 1) and 2), the sampling time interval is added as bright-dark interval of the signal at the beginning of the signal, for example, and the display device measures and stores the time interval and generates a clock for sampling the following data at the stored time intervals.

In the case of the methods 3) and 4), the sample clock is always sent from the PC, and the clock is extracted and outputted as a data sampling clock.

A comparator is provided in the screen adjusting control information extracting portion 16 in place of the ADC circuit portion 11 in the CRT display device 5. The MPU 17 can be substituted for the sample clock setting portion 25 and the screen adjusting control information extracting portion 16.

Thus even a picture display device which cannot internally generate a sampling clock by itself can provide the same effects by adding the screen adjusting control information and the clock data or timing information for detection to the image signal.

Fourth Preferred Embodiment

Next, the structure of a picture display device control system 300 according to a fourth preferred embodiment of the present invention will be described referring to FIG. 9.

Figure 9:
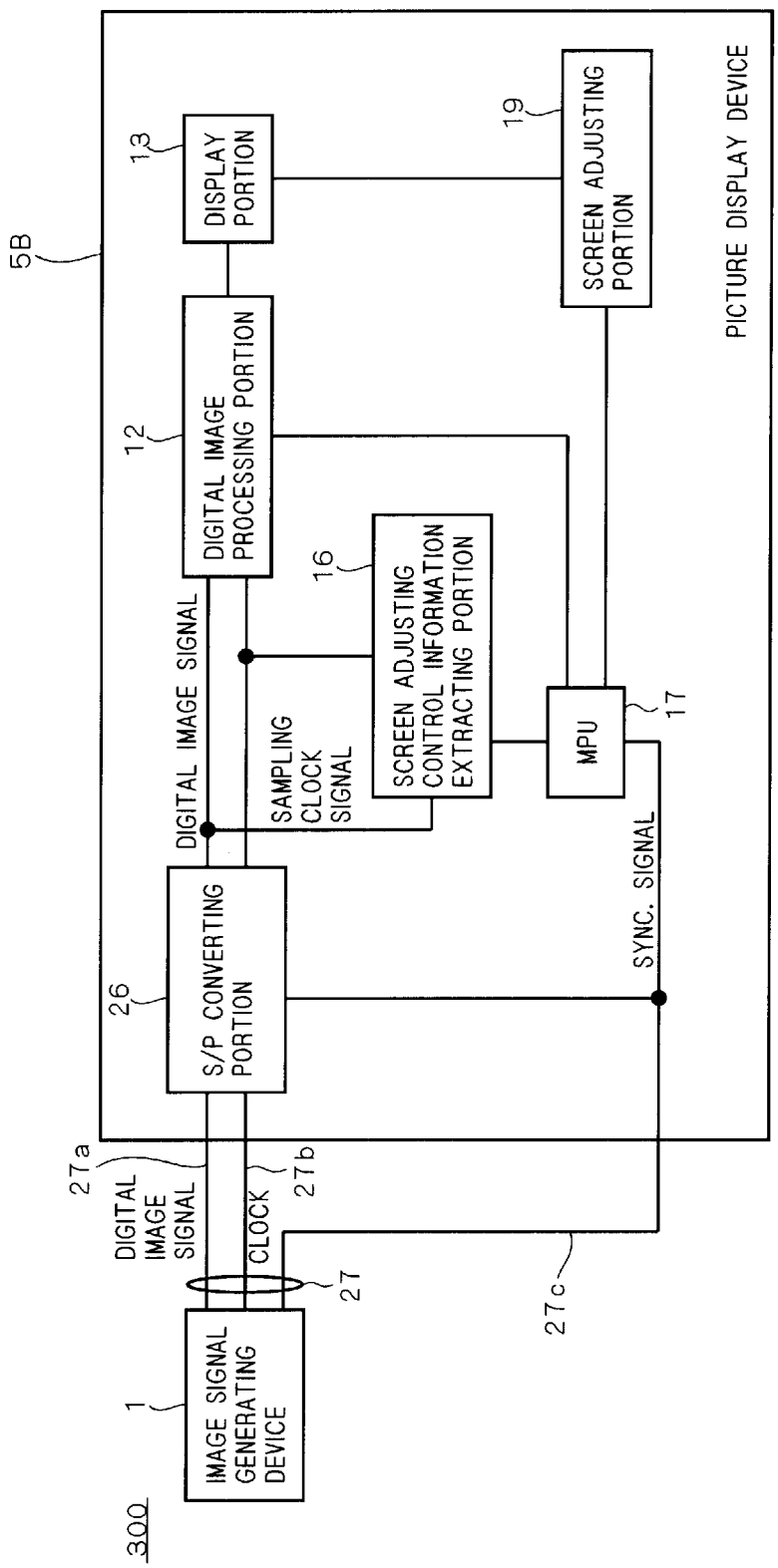
FIG. 9 is a block diagram showing the structure of a digital I/F adapted display device according to a fourth preferred embodiment.

FIG. 9 is a diagram mainly showing the structure of a picture display device 5B in the picture display device control system 300. As shown in FIG. 9, the picture display device 5B includes a serial/parallel (S/P) converting means 26 receiving a digital I/F signal and for converting it into parallel data and a digital I/F cable 27 carrying a digital image signal 27a, a clock 27b, and a sync. signal 27c in one cable. The same components as those in the picture display device 5 explained referring to FIG. 2A are shown at the same reference characters and are not explained here again.

Next, its operation will be described. The picture display device control systems 100 and 200 described above have shown structures in which an analog image signal is outputted from the PC 1. In the picture display device control system 300, the PC 1 outputs a digital image signal.

Also in the case of a digital image signal, the screen adjusting control information is added to the digital image signal in the same way as that in the picture display device control system 100 of the second preferred embodiment, for example, and eight-bit data (corresponding to data for one pixel for R, G, or B) is serially sent bit by bit in synchronization with a clock running with it, for example.

The S/P converting means 26 receives the serial data and clock and converts the data into a one-byte (eight-bit) digital image signal. At the same time, a sampling clock for the digital image signal is outputted.

That is to say, in the case of an image signal in which one byte is formed of eight bits, for example, the S/P converting means 26 samples the data serially sent bit by bit in accordance with the timing of the clock sent together, groups eight bits into one byte, and outputs it as parallel data. At the same time, a sampling clock is generated by eight-dividing the clock and outputted with the data, so as to control the sampling timing of the parallel data.

The above examples show the structure in which one bit of the screen adjusting control information is included in data corresponding to one pixel and the data is added to the image signal. In the case of a digital image signal, the signal can be included only in the least significant bit in the tone data. In this case, the screen adjusting control information is added to the least significant bit while leaving the remaining bits for the original image signal, so that the information can be less visible on the screen. Needless to say, the signal can be added to any other arbitrary bit, as well as to the least significant bit.

Fifth Preferred Embodiment

In the preferred embodiments described above, the screen adjusting control information is used to adjust the target screen in accordance with the adjusted items and adjusting data contained in the information. In the fifth preferred embodiment, the screen adjusting control information is regarded as a group of bright and dark pixels, and the bright and dark pixels are added as certain pattern before and behind the screen adjusting control information, which is positively used as various types of adjusting patterns. In this preferred embodiment, the same data is added to R, G and B so that the screen adjusting control information can be seen clearly.

Figure 10:
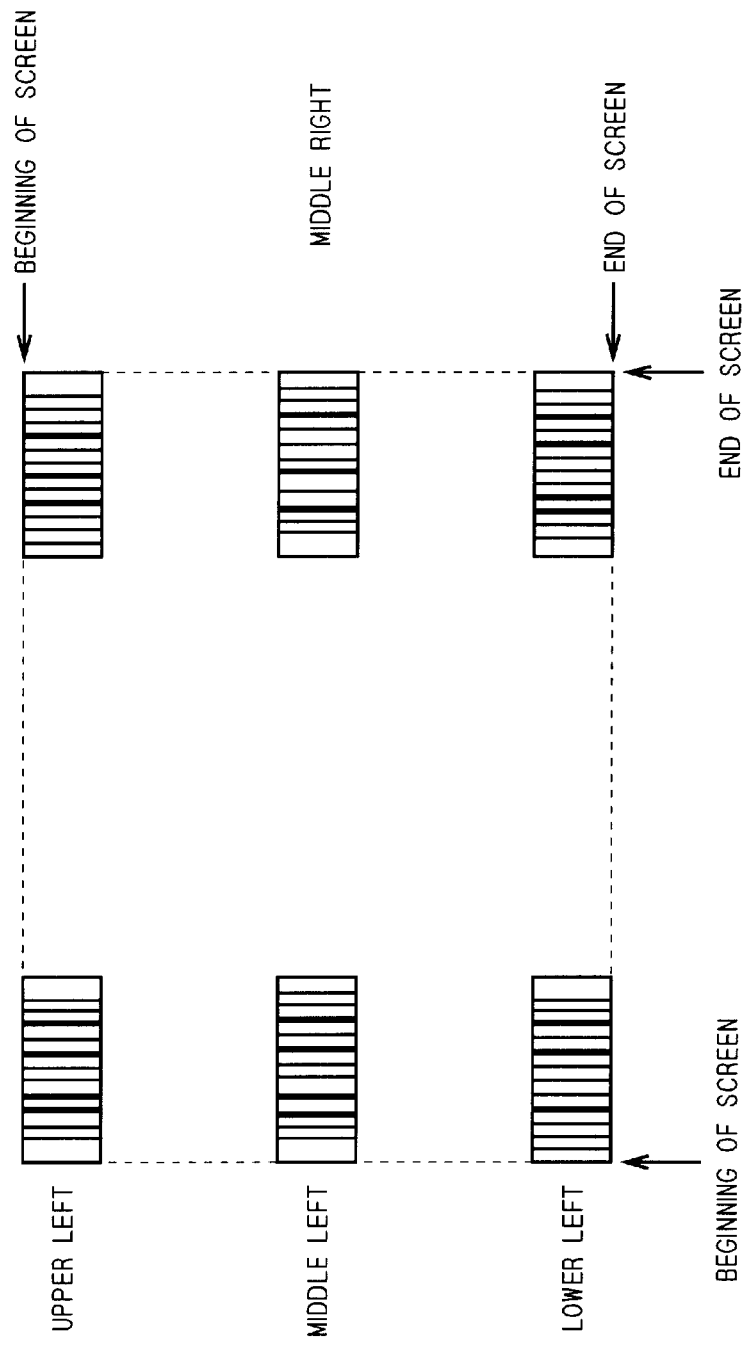
FIG. 10 shows an example of screen adjusting pattern generated with the screen adjusting control information according to a fifth preferred embodiment.

For example, bright data is added in the first ten-odd pixels, which is followed by alternating bright and dark data (the bright and dark data can be added thereto in arbitrary numbers of successive pixels), the screen adjusting control information, the alternating bright and dark data again, and bright data in ten-odd pixels at the end. This pattern is repeatedly outputted for several lines, whereby patterns as shown in FIG. 10 can be displayed in arbitrary positions on the screen.

Such patterns are displayed in the four corners and on the right and left sides in the middle area of the screen with the beginnings of bright located on the beginnings of the screen and the end of bright located on the end of the screen, which can be used as reference pattern for adjusting the position, size, inclination, distortion, etc. of the screen.

Further, the regularly repeated bright and dark pattern portion can be used to adjust the picture quality (focus, video characteristic, mis-convergence, phase between the sampling clock and image signal, etc.). When the pattern is displayed at the time of starting the power supply and at the time of switching the screen resolution, an image required for adjustments can be surely obtained, which simplifies the adjusting method and shortens the adjusting time, and provides an accurate adjusting screen.

As shown in FIG. 4, the bar code as means for generating the coded data contains bright data for 11 pixels in the horizontal direction at the beginning, which is followed by darkness for one pixel in the horizontal direction, brightness for one pixel, darkness for one pixel, and the bright pattern for one or more pixels, which is a signal form satisfying the fifth preferred embodiment. Since the bar codes are widely used in general, the use of this method is advantageous in respects of standardization and versatility.

Sixth Preferred Embodiment

Next, the structure of a picture display device control system 400 according to a sixth preferred embodiment of the invention will be described referring to FIG. 11.

Figure 11:
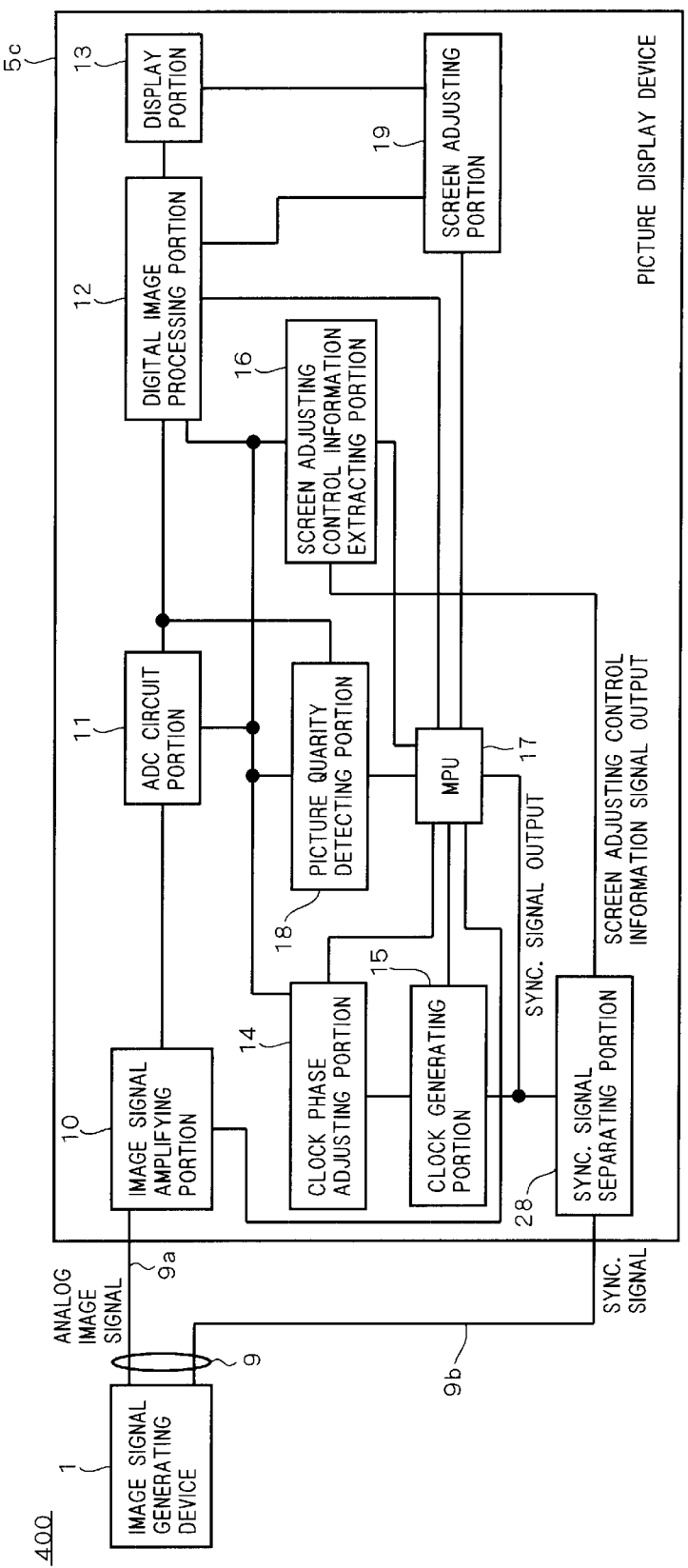
FIG. 11 is a block diagram showing a structure according to a sixth preferred embodiment in which the screen adjusting control information is added to a sync. signal.

FIG. 11 is a diagram mainly showing the structure of a picture display device 5C in the picture display device control system 400. As shown in FIG. 11, the picture display device 5C includes a sync. signal separating means 28 receiving a sync. signal to which the screen adjusting control information is added, for separating it into the sync. signal from which the screen adjusting control information is removed and the screen adjusting control information signal.

The separated screen adjusting control information signal is inputted to the screen adjusting control information extracting portion 16 and the sync. signal is used in the same way as the sync. signal in the picture display device 5 described referring to FIG. 2A. The same components as those in the picture display device 5 described referring to FIG. 2A are shown at the same reference characters and not described here again.

Figure 12:
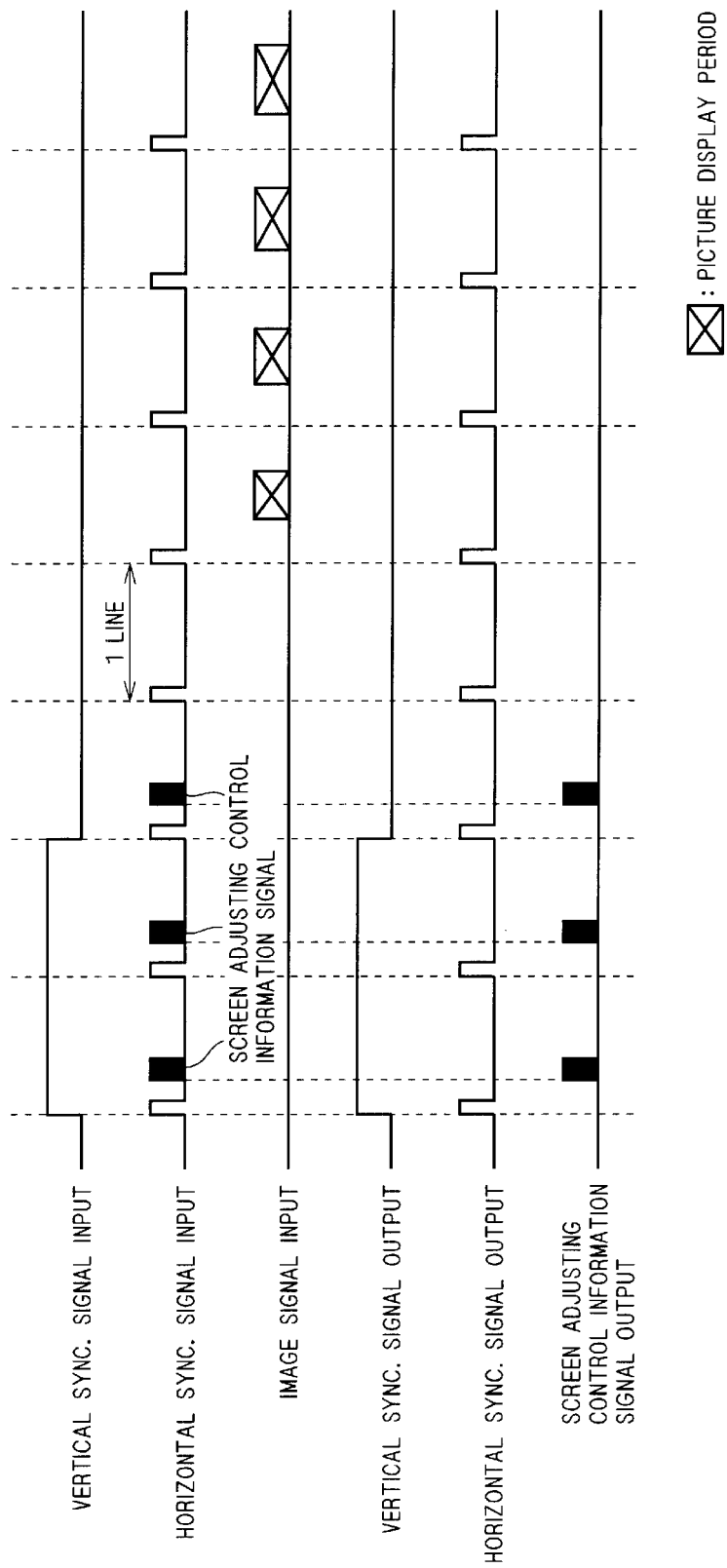
FIG. 12 is an explanation diagram showing input/output waveforms of the sync. signal separating portion of the sixth preferred embodiment.
Figure 13:
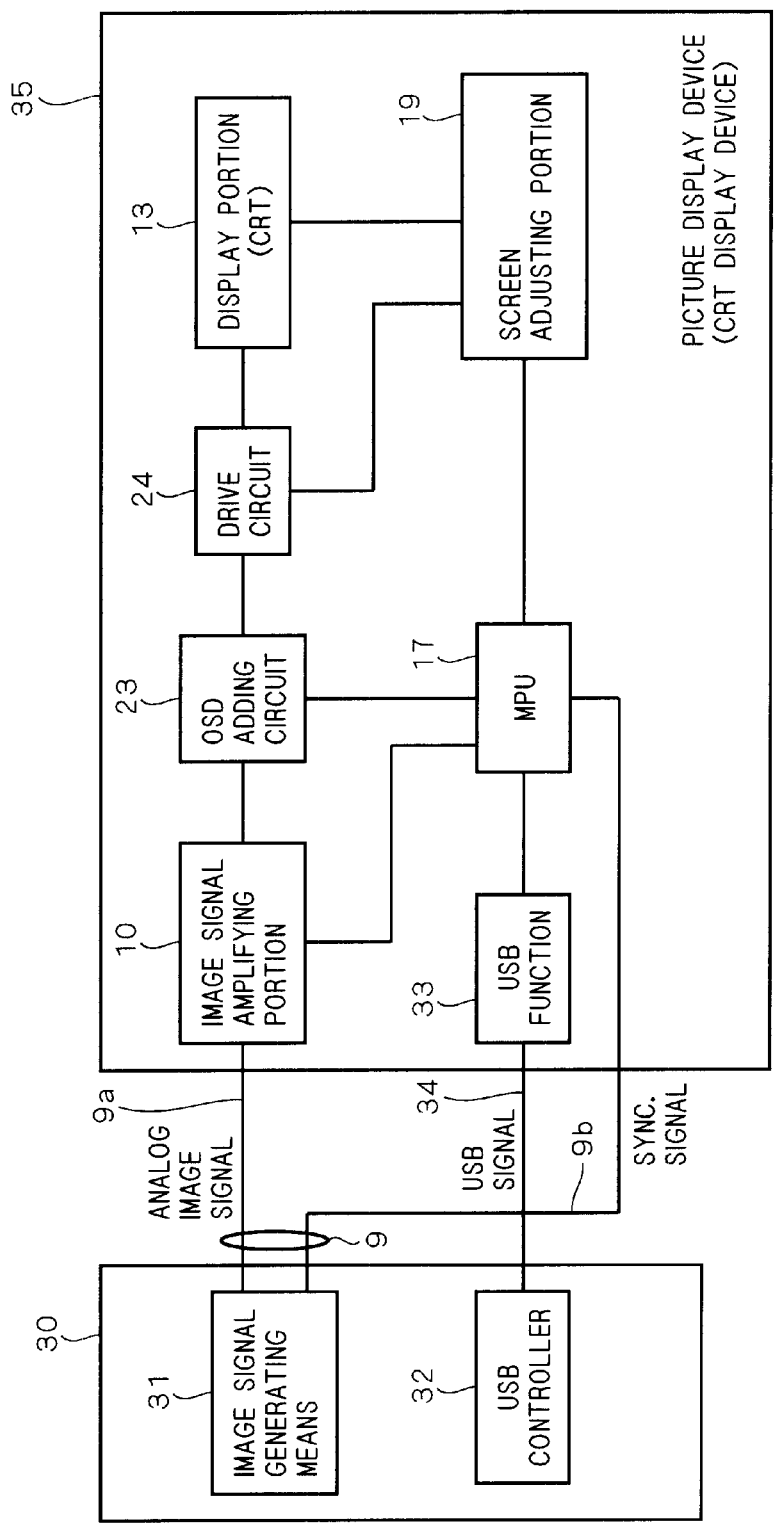
FIG. 13 is a block diagram showing the structure of a conventional CRT display device.
Figure 14:
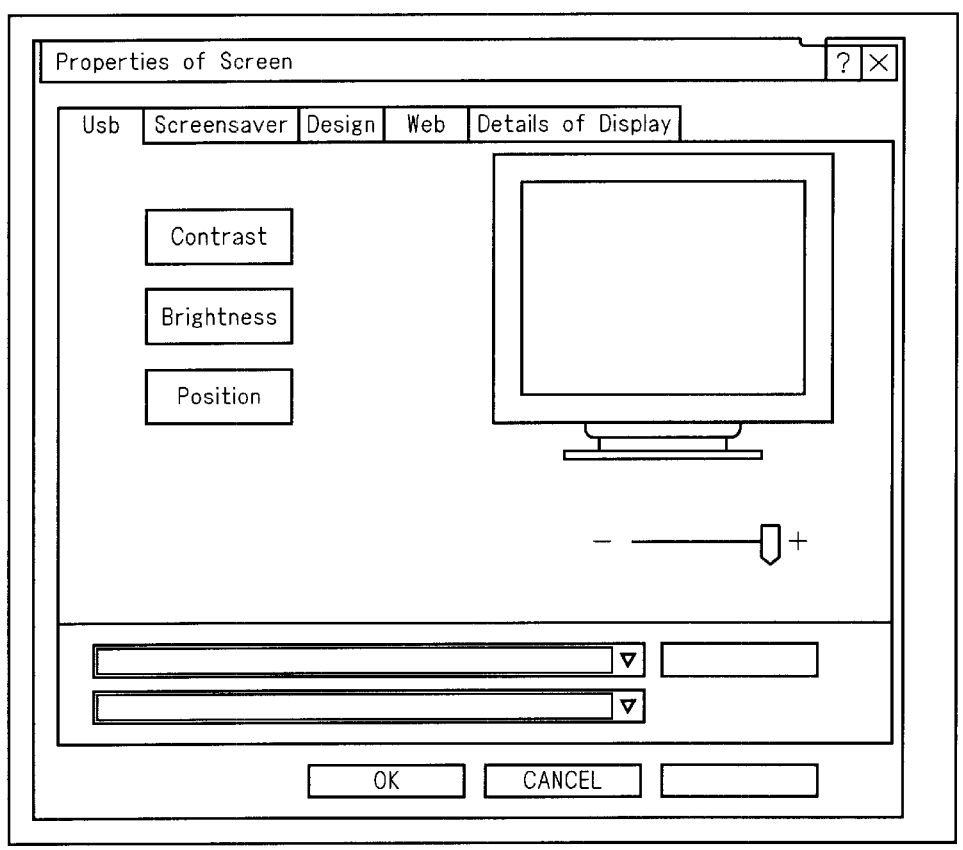
FIG. 14 shows an example of an adjusting screen displayed when adjustment is made through a conventional USB.

Next its operation will be described. In the picture display device control systems 100 to 300 described above, the screen adjusting control information is added to the image signal by replacing it. However, as shown in FIG. 12, the screen adjusting control information in binary form may be inserted for part of the sync. signal in arbitrary positions in the sync. signal.

The sync. signal separating portion 28 shown in FIG. 11 receives the sync. signal containing the screen adjusting control information replacing part of the sync. signal. As shown in FIG. 12, the signal in which the screen adjusting control information is masked is outputted as the sync. signal and used as a common sync. signal. The signal in which the sync. signal is masked is outputted as the screen adjusting control information signal and sent to the screen adjusting control information extracting portion 16.

The sync. signal basically exists as a binary signal at 0 V and 5 V, or 3.3 V, 3 V, 2.5 V, for example. Placing the screen adjusting control information in binary form for part of the sync. signal enables good noise resistance and easy extraction. Further, original screen can be displayed in all area without being interrupted by the screen adjusting control information.

While the screen adjusting control information is added by means of software in the description above, it can be added by using hardware.

While the invention has been described in detail, the foregoing description is in all respects illustrative and not restrictive. It is understood that numerous other modifications and variations can be devised without departing from the scope of the invention.

What is claimed is:

1. A picture display control system comprising:

an image signal generating device for adding screen adjusting control information for screen adjustment to an image signal and outputting the image signal; and a picture display device having picture display means receiving as an input the image signal to which the screen adjusting control information is added and which is outputted from said image signal generating device;

detecting means for detecting the screen adjusting control information from the image signal to which said screen adjusting control information is added; and screen adjusting means for making adjustment on the basis of said screen adjusting control information detected by said detecting means.

2. The picture display control system according to claim 1, wherein said screen adjusting control information adding means inserts signal in a bit in one arbitrary position in said tone data when said tone information is represented as digital data.

3. The picture display control system according to claim 1, wherein said screen adjusting control information adding means determines whether said screen adjusting control information has been normally received by detecting data error check information for validating received data which is added to said screen adjusting control information.

4. The picture display control system according to claim 1, wherein said screen adjusting control information adding means adds said screen adjusting control information in bar code form, and said detecting means detects the bar code information as said screen adjusting control information.

5. The picture display control system according to claim 1, wherein said screen adjusting control information adding means adds the screen adjusting control information to the image signal as tone information in part of pixels among pixels forming a displayed picture, and said detecting means extracts said screen adjusting control information by using at least one threshold from the image signal to which said screen adjusting control information is added.

6. The picture display control system according to claim 5, wherein said screen adjusting control information adding means inserts signal in a bit in one arbitrary position in tone data when said tone information is represented as digital data.

7. The picture display control system according to claim 5, wherein said screen adjusting control information adding means determines whether said screen adjusting control information has been normally received by detecting data error check information for validating received data which is added to said screen adjusting control information.

8. The picture display control system according to claim 5, wherein said screen adjusting control information adding means adds said screen adjusting control information in bar code form, and said detecting means detects the bar code information as said screen adjusting control information.

9. A picture display device comprising:

picture display means receiving as an input an image signal to which screen adjusting control information for adjusting and controlling a screen is added;

detecting means for detecting said screen adjusting control information from the image signal to which said screen adjusting control information is added; and screen adjusting means for making adjustment on the basis of said screen adjusting control information detected by said detecting means.

* * * * *